United States Patent [19]
McLaughlin et al.

[11] Patent Number: 5,998,952
[45] Date of Patent: Dec. 7, 1999

[54] METHOD AND APPARATUS FOR REDUCING TORQUE RIPPLE IN AN ELECTRIC MOTOR USING ANTICASUAL FILTERING

[75] Inventors: Kevin Michael McLaughlin, Troy, Mich.; Stuart Walter Parker, Redondo Beach, Calif.

[73] Assignee: TRW Inc., Lyndhurst, Ohio

[21] Appl. No.: 08/835,630

[22] Filed: Apr. 9, 1997

[51] Int. Cl.⁶ ........................................... H02P 7/00
[52] U.S. Cl. ............................. 318/432; 318/696
[58] Field of Search ....................... 318/432, 439, 318/701, 721, 696, 254; 388/907, 907.5

[56] References Cited

U.S. PATENT DOCUMENTS

| | | | |
|---|---|---|---|
| 4,525,657 | 6/1985 | Nakase et al. | 318/254 |
| 4,670,696 | 6/1987 | Byrne et al. | 318/701 |
| 4,862,343 | 8/1989 | Nomura et al. | 363/41 |
| 4,868,477 | 9/1989 | Anderson et al. | 318/696 |
| 4,868,744 | 9/1989 | Anderson et al. | 318/696 |
| 4,890,048 | 12/1989 | Hunter | 318/696 |
| 4,961,038 | 10/1990 | MacMinn | 318/696 |
| 5,406,155 | 4/1995 | Persson | 310/68 B |
| 5,469,215 | 11/1995 | Nashiki | 318/432 |
| 5,473,231 | 12/1995 | McLaughlin et al. | 318/433 |
| 5,475,289 | 12/1995 | McLaughlin et al. | 318/432 |
| 5,568,389 | 10/1996 | McLaughlin et al. | 364/424.5 |

FOREIGN PATENT DOCUMENTS

055950A1  8/1990  European Pat. Off. .

OTHER PUBLICATIONS

A copy of European Search Report Dated Jul. 15, 1998.

An article by R.C. Kavanagh et al. entitled "Torque Ripple Minimization in Switched Reluctance Drives Using Self–Learning Techniques", dated Oct. 28, 1991, from Proceedings of the International Conference on Industrial Electronic Control and Instrumentation (IECON), KOBE, Oct.28–Nov. 1, 1991, vol. 1, NR Conf. 17, pp. 289–294, Institute of Electrical and Electronics Engineers XP000346303.

Patent Abstracts of Japan vol. 013, No. 117 (E–731), dated Mar. 22, 1989 and JP 63 287386A (Canon Inc.), Nov. 24, 1988.

An article by P. Nagel entitled "Non–Causal Complementary Filters", dated Nov. 1, 1992 from Signal Processing European Journal Devoted to the Methods and Applications of Signal Processing, vol. 29, NR. 2, pp. 151–164, XP000356161.

*Primary Examiner*—Karen Masih
*Assistant Examiner*—Rina I. Duda
*Attorney, Agent, or Firm*—Tarolli, Sundheim, Covell, Tumino & Szabo LLP

[57] ABSTRACT

Current control values are established for an electric motor including providing a table of motor current control values as a function of motor operating angle, providing a torque request signal indicative of the desired amount of torque to be supplied by the motor, and providing a torque command signal having a value functionally related to the torque request signal and a feed-forward torque signal. The motor operating angle is monitored and the motor is energized using current control values from the table in response to the torque command signal. The amount of torque ripple experienced by the motor is measured when the motor is energized. The measured torque ripple is filtered using a time domain filter and a time domain filtered torque ripple signal is provided. The time domain filtered torque ripple signal is then averaged and the averaged time domain filtered torque ripple signal is then filtered using a spatial domain filter, the spatially filtered averaged time domain filtered torque ripple signal is the used as the feed-forward torque signal. The current control values output to the motor is stored as a function of motor operating angle for the provided torque request value when the torque ripple value is less than a predetermined value.

12 Claims, 5 Drawing Sheets

METHOD AND APPARATUS FOR REDUCING TORQUE RIPPLE IN AN ELECTRIC MOTOR USING ANTICASUAL FILTERING

TECHNICAL FIELD

The present invention is directed to electric motors and is specifically directed to a method for reducing torque ripple in an electric motor of the type which is commutated based on sensed motor rotor position.

BACKGROUND OF THE INVENTION

An inherent problem, known in the art as "torque ripple," exists in the use of electric motors of the type in which motor commutation is controlled in response to sensed motor rotor position. Motors of this type are commonly used as stepping motors to control the position or orientation of a driven member. When such a motor is continuously energized, the amount of torque produced by the motor varies as a function of the motor's rotor position. This variation in the torque is the motor's torque ripple. The torque ripple is the amount of the fluctuation between a maximum torque and a minimum torque as the motor is driven at a constant rate and constant load. Since the motor is continuously energized, the torque ripple also varies over time.

One particular type of electric motor that exhibits torque ripple during its use is a variable reluctance motor. Variable reluctance motors and their principle of operation are known in the art. These motors are well suited to many applications due to their high torque-to-inertia operating ratio. A limiting factor in the use of a variable reluctance motor for continuous drive systems, however, has been the torque ripple they exhibit during use.

Known systems have utilized various techniques for controlling torque and torque ripple during operation of a variable reluctance motor. For example, U.S. Pat. No. 4,868,477 to Anderson et al., is directed to an arrangement for controlling torque and torque ripple in a variable reluctance motor. In accordance with the '477 patent, a constant current is applied to each motor phase. In response to this applied constant current, a torque waveform as a function of rotor position is generated for each motor phase. A plurality of torque waveforms are generated by applying a plurality of constant current values. The plurality of torque waveforms are then used to determine a table of values. Each value in the table corresponds to the current to be supplied to a motor phase for a given rotor position to achieve the desired motor torque with reduced torque ripple.

U.S. Pat. No. 4,961,038 is directed to an arrangement for estimating torque generated by a switched reluctance motor using a look-up table to generate a torque estimate based upon phase current and rotor position. The estimated torque is used as a torque feedback signal to a controller to modulate motor phase current commands to reduce torque ripple.

A basic problem with known motor control systems is that these systems assume a linear superposition of the torque generated by the individual phase coils of the motor. In effect, these systems assume that the sum of the torque generated by exciting adjacent coils individually is the same as the motor output torque when the two phases are simultaneously excited. Control arrangements that make this assumption often exhibit torque ripple during motor operation.

Another control arrangement for reducing torque ripple in a switched reluctance motor has been proposed in a paper entitled "*Control of Switched Reluctance Motor Torque for Force Control Applications*" by Andrew A. Goldenberg, Izhak Laniado, Pawel Kuzan, and Chin Zhou, IEEE Transactions On Industrial Electronics, Vol. 41, No. 4, August 1994, pages 461–466. In accordance with the article, the switched reluctance motor torque function is evaluated off-line by (1) commanding a constant current using a proposed commutation algorithm, (2) moving the motor one electrical period, and (3) measuring the torque during this movement. The procedure is repeated with distinct current values from zero to a maximum value so as to get a set of torque curves versus position and current. The set of curves is used to generate a look-up table. Torque versus position and current is smoothed using an inverse torque function. The torque function is estimated by taking the average of the measured torque in two directions and then subtracting friction from the measured torque. Friction is compensated using feed-forward controllers to provide a current correction term derived from the look-up table.

SUMMARY OF THE INVENTION

The present invention provides a method and apparatus for determining motor current control values for storage in a look-up table that provide substantially reduced torque ripple during motor operation. The present arrangement obtains signal noise suppression without corrupting signal phase.

In accordance with the present invention, a method is provided for establishing current control values for an electric motor comprising the steps of providing a table of motor current control values as a function of motor operating angle, providing a torque request signal indicative of the desired amount of torque to be supplied by the motor, and providing a torque command signal having a value functionally related to the torque request signal and a feed-forward torque signal. The motor operating angle is monitored and the motor is energized using current control values from the table in response to the torque command signal. The amount of torque ripple experienced by the motor is monitored when the motor is energized. The measured torque ripple is filtered using a time domain filter and a time domain filtered torque ripple signal is provided. The time domain filtered torque ripple signal is averaged and the averaged time domain filtered torque ripple signal is filtered using a spatial domain filter. A feed-forward torque signal is provided in response thereto, and current control values output to the motor as a function of motor operating angle for the provided torque request value are stored when the torque ripple value is less than a predetermined value.

In accordance with another embodiment of the present invention a method is provided for providing a torque request signal indicative of the desired amount of torque to be supplied by an electric motor, comprising the steps of providing a torque command signal having a value functionally related to a torque request signal and a feed-forward torque signal and monitoring motor operating angle. The method further includes the steps of energizing the motor in response to the torque command signal, measuring the amount of torque ripple experienced by the motor when the motor is energized, filtering the measured torque ripple using a time domain filter and providing a time domain filtered torque ripple signal. The method further includes the steps of averaging the time domain filtered torque ripple signal, filtering the averaged time domain filtered torque ripple signal using a spatial domain filter and providing the feed-forward torque signal in response thereto, and storing feed-forward torque signals for later use to achieve a low torque ripple motor.

Also, in accordance with the present invention, an apparatus for establishing current control values for an electric motor comprises memory means for storing a table of motor current control values as a function of motor operating angle, input means for providing a torque request signal indicative of the desired amount of torque to be supplied by the motor, and means for providing a torque command signal having a value functionally related to the torque request signal and a feed-forward torque signal. Means are provided for monitoring motor operating angle. Control means energizes the motor using current control values from the table stored in the memory means in response to the torque command signal. Means are provided for measuring the amount of torque ripple experienced by the motor when the motor is energized. Time domain filter means filters the measured torque ripple signal in the time domain and provides a time domain filtered torque ripple signal. Means are provided for averaging the time domain filtered torque ripple signal. Spatial filter means filters the averaged time domain filtered torque ripple signal in the spatial domain and provides said feed-forward torque signal in response thereto. Memory means stores current control values output to the motor as a function of motor operating angle for the provided torque request value when the torque ripple value is less than a predetermined value.

BRIEF DESCRIPTION OF THE DRAWINGS

Further features and advantages of the present invention will become apparent to those skilled in the art from reading the following detailed description with reference to the accompanying drawings, in which.

DESCRIPTION OF PREFERRED EMBODIMENTS

Figure 1:
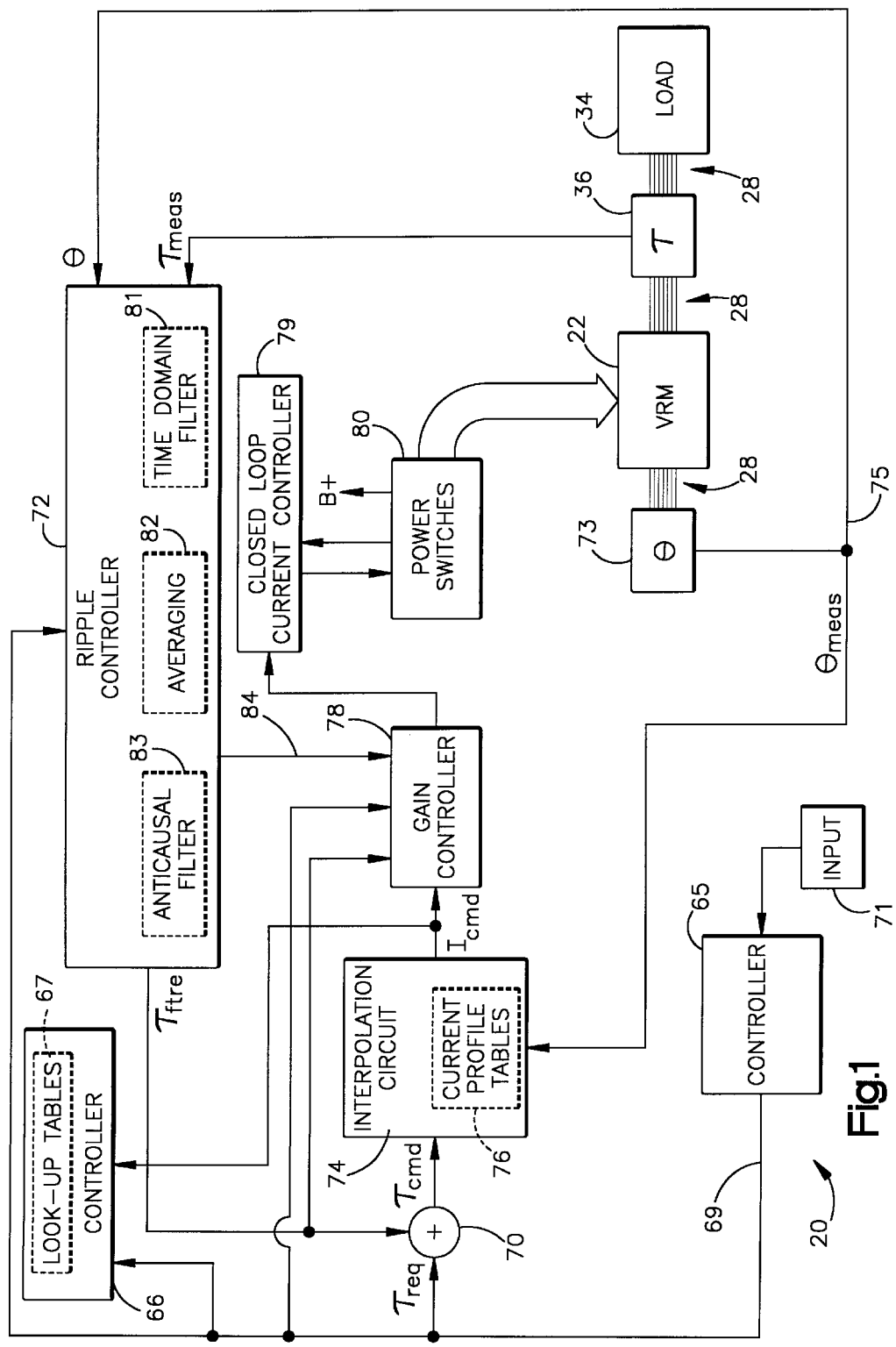
FIG. 1 is a schematic block diagram of a system, made in accordance with the present invention, for establishing current control values for an electric motor.

Referring to FIG. 1, a test stand arrangement 20 is shown that, in accordance with the present invention, is used to establish motor current control values for an electric motor 22. Although the present invention is applicable to any electric motor of the type that is controlled in response to sensed rotor position, it is described herein for use with a variable reluctance motor. The invention is not limited in its use to variable reluctance motors.

For the purposes of discussion, the variable reluctance motor 22 is described herein is an eight stator pole/four rotor pole, four phase motor with the specific purpose of providing power assist in a rack and pinion steering system. The present invention is equally applicable to other motor configurations and other motor purposes such as machine tools. In an electric assist steering system, torque ripple exhibited by the electric assist motor during operation can be felt by the vehicle operator through the steering wheel. Therefore, it is desirable to minimize torque ripple in a steering system using an electric assist motor. query/

Figure 2:
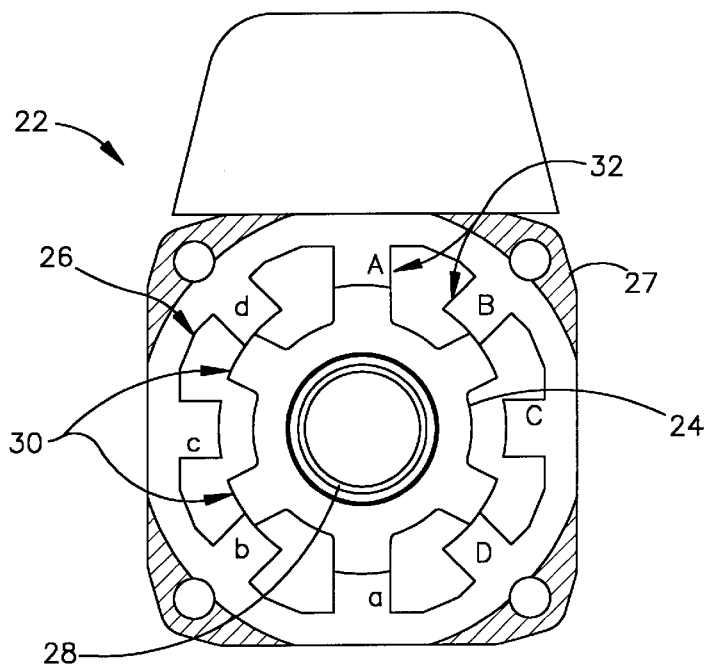
FIG. 2 is a cross-sectional view of a variable reluctance motor.

Referring to FIG. 2, the motor 22 includes a rotor 24 and a stator 26. The stator 26 is secured to a motor housing 27. The rotor 24 is connected a motor connection tube 28. The rotor 24 has six rotor poles 30, and the stator 26 has eight stator poles 32. The motor 22 is a four phase motor. The four phases are designated Phase A, Phase B, Phase C, and Phase D. Phases A, B, C, and D correspond to stator poles Aa, Bb, Cc, and Dd, respectively. The stator poles carry associated coils (not shown) in a manner well known in the art. The motor 22 is described as a four phase variable reluctance motor merely for the sake of clarity and ease of description. As mentioned, the present invention is not limited to this particular motor type, nor arrangement, and can be used with any electric motor that is controlled in response to sensed rotor position.

The operation of a variable reluctance motor is known in the art and is not described herein in detail. U.S. Pat. No. 4,670,696 to Byrne et al. describes the construction and operation of a typical variable reluctance motor and is hereby fully incorporated herein by reference.

Figure 3:
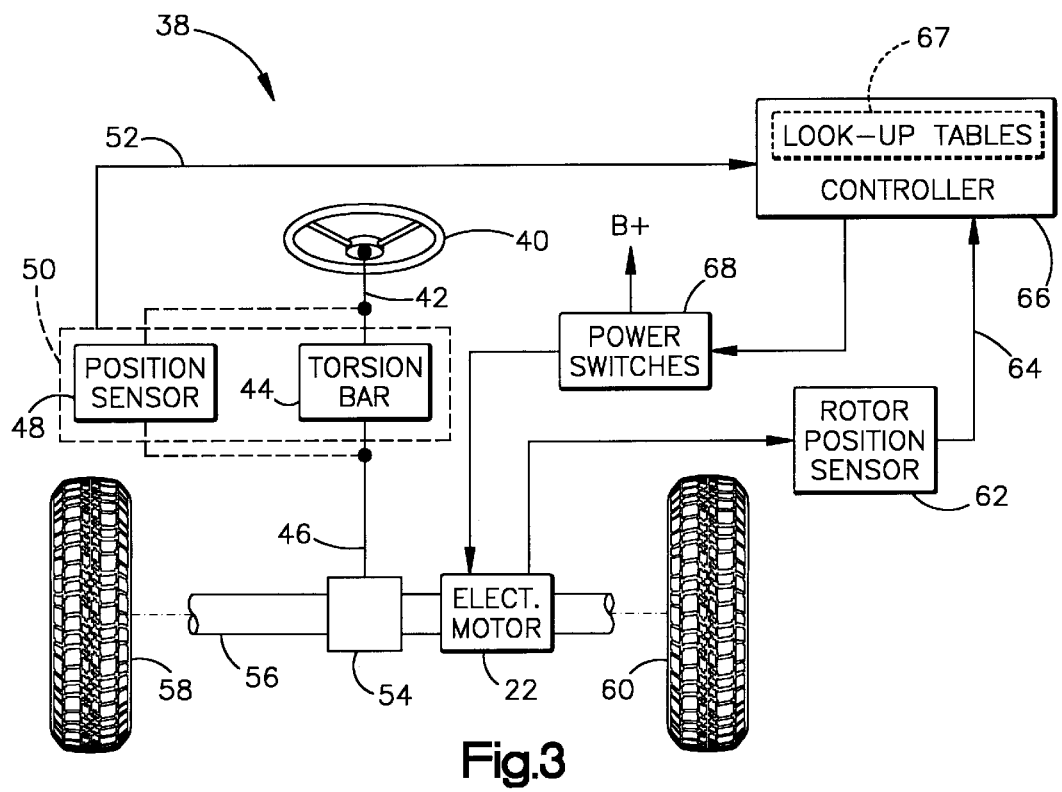
FIG. 3 is a schematic block diagram of an electric power assist steering system which includes the variable reluctance motor of FIG. 2.

Referring to FIG. 3, an electric power assist steering system 38 includes a steering wheel 40 connected to an input shaft 42. The input shaft 42 is connected through a torsion bar 44 to an output shaft 46. A position sensor 48 is connected to the input shaft 42 and to the output shaft 46. The position sensor 48 determines the relative rotational position between the input shaft 42 and the output shaft 46. Because of the torsion bar 44, this relative rotational position between the input shaft 42 and the output shaft 46 is indicative of the amount of steering torque applied to the steering wheel 40. Thus, the combination of the position sensor 48 and the torsion bar 44 function together as a torque sensor 50. The torque sensor 50 provides an applied steering torque signal 52 having a value indicative of the amount of steering torque applied to the steering wheel 40.

The output shaft 46 is connected to a pinion gear of a rack and pinon gear set 54. The rack and pinon gear set 54 functions to transform the rotational motion of the steering wheel 40 into linear motion of a steering rack 56. The steering rack 56 is steerably connected to steerable wheels 58, 60 of the vehicle in a manner well known in the art. The linear movement of the steering rack 56 steers the steerable wheels 58, 60 of the vehicle. The connection tube 28 of the variable reluctance motor 22 is drivably connected to the rack 56 through a ball-nut assembly in a manner known in the art. One such ball-nut drive arrangement between an electric assist motor and a rack member is shown in U.S. Pat. No. 4,666,014 to Carlson et al. and is hereby fully incorporated herein by reference.

A motor rotor position sensor 62 is operatively coupled to the motor 22 and senses the position of the rotor 24 relative to the stator 26 and provides a rotor position signal 64 having a value indicating that relative position therebetween. The structure and operation of a rotor position sensor for use with a variable reluctance motor is known in the art and is, therefore, not described herein in detail.

A preferred rotor position sensor for use with the present invention is disclosed in U.S. patent application Ser. No.

08/329,206, filed Oct. 10, 1994, to Persson et al., entitled "Method and Apparatus for Sensing Relative Position Between Two Relatively Rotatable Members Using Concentric Rings", and is hereby fully incorporated herein by reference.

The rotor position sensor 62 measures the rotor electrical angle as opposed to the rotor's mechanical angle relative to the stator. A mechanical cycle of 360 mechanical degrees occurs when the rotor is rotated one complete revolution. An electrical cycle of 360 electrical degrees occurs when the motor is rotated through 60 mechanical degrees. Therefore, there are 6 electrical cycles for every 1 mechanical cycle for the preferred 8/6 variable reluctance motor arrangement described herein. In accordance with a preferred embodiment, zero electrical degrees is defined as the rotor position which occurs when Phase D is locked with sufficient current to overcome friction effects. Note that there are six possible rotor mechanical locations where energizing Phase D will lock the rotor, i.e., the rotor location when a rotor tooth is fully aligned with the stator teeth Dd. All six of these rotor positions (one for each six rotor teeth) will be measured as zero electrical degrees. Electrical cycles are convenient to use because the torque generated by a variable reluctance motor as phases Aa, Bb, Cc, and Dd are energized is essentially the same for each electrical cycle.

A controller 66, such as a microcomputer, monitors the rotor position signal 64 and the applied steering torque signal 52 and, in response thereto, controls the energization of the motor 22 through power switches 68. A preferred drive arrangement for the power switches 68 is fully described in U.S. patent application Ser. No. 08/334,231, filed Nov. 4, 1994, to Beck entitled "Method and Apparatus for Controlling an Electric Assist Motor", which is hereby fully incorporated herein by reference.

The controller 66 is preferably a microcomputer having an internal ROM memory used as a look-up table 67. Also, the look-up table could be stored in a flash RAM. Stored in this look-up table 67 are motor current control values used for control of the motor 22. The motor current control values are stored in the look-up table 67 as a function of the desired steering assist torque and sensed rotor position.

The controller 66 selects a motor current value from the table as a function of the applied steering torque signal 52 and sensed rotor position. The motor current value is that value of current that must be applied to the motor 22 so that the motor provides a desired amount of steering assist torque. Other variables, e.g., vehicle speed, could be considered in selection of the motor current value needed to achieve the desired steering assist. An arrangement that includes a steering system that looks up a motor control value in a look-up table is fully described in U.S. Pat. No. 5,475,289 to McLaughlin et al. entitled "Method and Apparatus for Controlling an Electric Assist Steering System Using Two-Dimensional Interpolation for Current Commands", which is hereby fully incorporated herein by reference.

In accordance with a preferred embodiment of the present invention, the motor current control values used to control the electric assist motor 22 are stored in a plurality of look-up tables (i.e., the look-up table 67 is partitioned to form a plurality of separate look-up tables). Preferably, the memory device is partitioned to form ten look-up tables. The maximum expected value of steering assist torque is divided by ten to define ten incremental levels of steering assist torque. Sets of current control values corresponding to each of the ten incremental values of steering assist torque are stored in associated look-up tables. For example, table number one has current control values as a function of rotor position for a steering torque assist value equal to 10% of the maximum steering assist torque value, table two has current control values as a function of rotor position for a steering torque assist value equal to 20% of the maximum expected steering assist torque value, etc. Because the use of the look-up tables requires that values of both the steering assist torque and the motor control values are discrete values (only discrete values can be stored in a look-up table), smaller incremental values can be determined, in accordance with the preferred embodiment, through an interpolation process. Such an interpolation process is described in the above incorporated U.S. Pat. No. 5,475,289 to McLaughlin et al.

Of concern with the use of a variable reluctance motor and, in particular, with its use in an electric assist steering system, is the occurrence of torque ripple. Torque ripple is a torque variation in the motor's output that occurs when a constant torque is commanded from the motor. The phenomenon of torque ripple is well known in the art of variable reluctance motors. In an electric assist steering system, torque ripple is particularly undesirable because it can be felt by the vehicle operator through the steering wheel.

In accordance with the present invention, torque ripple that would typically occur in the operation of the variable reluctance motor is substantially reduced by establishing current control values in the look-up table 67 through a process of anticausally filtering torque ripple estimates. To establish these values for the look-up tables 67, in accordance with the present invention, the motor operation is monitored under load conditions.

Referring to FIG. 1, the test stand arrangement 20 is a dynamometer used to establish current control values that will be stored in the look-up tables 67 to provide substantially reduced ripple in the electric assist steering system 38. The test stand 20 operates the motor 22 under load conditions. A load 34 is connected to the motor output tube 28. The load 34 provides a constant load on the motor 22 when the motor is energized. A torque sensor 36 is operatively connected to the motor output tube 28 and provides a signal having a value which indicates the output torque $\tau_{meas}$ of the motor 22, i.e., the motor's measured output torque.

A controller 65 is connected to an input device 71. The input device 71 is preferably a keyboard or other known input device. The input device 71 is used to input a desired torque request to the controller 65. This torque request is the desired torque to be developed by the motor 22. A torque request $\tau_{req}$ value 69 is output from controller 65 to one input of a summing circuit 70.

The summing circuit 70 sums the value of the torque request $\tau_{req}$ with a filtered torque ripple estimate vector $\tau_{ftre}$ (described below) provided by a torque ripple controller 72. The torque ripple estimate vector $\tau_{ftre}$ is also referred to herein as the feed-forward torque signal. The summing circuit 70 outputs a torque command signal $\tau_{cmd}$ which is equal to the sum of the torque request value $\tau_{req}$ from controller 67 and the filtered torque ripple estimate vector $\tau_{ftre}$ from the torque ripple controller 72. The torque command signal $\tau_{cmd}$ is output from the summing circuit 70 to an interpolation circuit 74. A rotor position sensor 73 is operatively connected to the motor 22 and provides a rotor position signal 75 having a value indicative of the relative rotational position between the motor rotor 24 and the motor stator 26.

For an 8/6 (eight stator pole/six rotor pole) variable reluctance motor, there are 6 electrical cycles per one mechanical revolution of the motor's rotor. In accordance with one embodiment of the present invention, the electrical angle refers to electrical cycle angles and mechanical angle refers to absolute rotor position. Calculations performed in accordance with the present invention are done in terms of the electrical angle. One skilled in the art will appreciate that calculations could be done in terms of the mechanical angle. By doing computations in terms of electrical cycles, there is an assumption that all electrical cycles produce torque that is identical. Although this assumption is not completely accurate, it does provide good results.

The rotor position sensor 73 is a resolver that outputs 14 bits (or $21^4$ counts) of data equivalent to 360 mechanical degrees of rotation. This sensor provides a resolution of $360/2^{14}$ mechanical degrees, i.e., equivalent to 0.02187 mechanical degrees or 6×0.02197=0.1318 electrical degrees. Recall that there are 6 electrical degrees per mechanical degree because an electrical cycle is only 60 mechanical degrees or $\frac{1}{6}^{th}$ of a mechanical cycle. Assuming that zero mechanical degrees corresponds to one of the six possible rotor angles for zero electrical degrees, the measure of mechanical angle is easily converted to electrical angle for the present 8/6 motor as:

$$\theta_{electrical} = 6 \times (\theta_{mechanical} - \zeta(\theta_{mechanical}/6) \times 60)$$

where 70 is the integer function that truncates the result of the divide to the next lowest integer. The function $\zeta(\theta_{mechanical}/6)$ computes the number of electrical cycles. Multiplying this result by 60 and subtracting it from the measured mechanical angle provides a measure of how many mechanical degrees the rotor is within the present electrical cycle. This result is then multiplied by 6 to convert it to an electrical angle. The rotor position signal 75 is output to the interpolation circuit 74.

The interpolation circuit 74 monitors the torque command signal $\tau_{cmd}$ (which is the sum of $\tau_{req}$ and $\tau_{ftre}$) and the rotor position signal and, in response thereto, outputs four motor current commands $I_{cmd}$ signals, i.e., one for each of the four motor phases.

To establish the current command $I_{cmd}$ signals, the interpolation circuit 74 utilizes four sets of prestored, predetermined current profile tables 76, one set of tables for each of the four phases of the motor. The current profile tables are stored in an internal memory 76 of the interpolation circuit 74.

Each of the sets of current profile tables has a plurality of 1×n arrays of stored current values, each array associated with a particular torque command value $\tau_{cmd}$. The current value within the array is selected in response to a sensed motor rotor position. The number of current values n stored in each of the arrays is related to the electrical angular resolution of the rotor position sensor 73. In accordance with a preferred embodiment, n equals 200. Therefore, each of the current profile tables for a motor phase has 200 current values for an associated torque command value $\tau_{cmd}$. Each set of stored current control profile tables for the four phases is associated with a 10% increment of, the maximum allowable torque value from the motor 22.

The sets of initial current profile tables for use in memory 76 may be obtained in a variety of ways. For example, initial current profile tables 76 may be calculated for the particular motor 22 being controlled. Such calculated initial tables 76 would be based upon a theoretical model of the motor 22, i.e., tables having current values required to cause the theoretical motor to develop the desired output torque. Alternatively, the motor manufacturer can provide initial current profile tables 76 for the particular motor being used.

Also, current profile tables 76 may be generated based upon an average of a plurality of motors of the particular motor model of concern. The only limitation on the initial values stored in the current profile tables 76 is that the stored values must generate the average output torque at each associated 10% torque level. Torque ripple can occur if the motor was controlled using those initial stored values 76 in the tables 67. The values in the torque table 76 must produce close to the associated average or DC torque level, i.e., ±10%. They do not have to produce the exact average.

One set of current profile tables (10 sets of tables, each table having a set of current control values for an associated 10% torque increment value) is stored in 76. Although each increment of torque has tables for each of the four phases, each set of tables is used independent of the motor operating direction. An electric motor has, what is referred to in the art, as four quadrants of operation. If the motor is being commanded to turn clockwise (positive) and is, in fact, turning clockwise (positive), the motor is said to operating in quadrant I. If the motor is being command to turn counterclockwise (negative) and is, in fact, turning counterclockwise (negative), the motor is said to be operating in quadrant III. If the motor is being commanded to turn to the clockwise (positive) and is, in fact, turning counterclockwise (negative), the motor is said to operating in quadrant II. If the motor is being command to turn counterclockwise (negative) and is, in fact, turning to the clockwise (positive), the motor is said to be operating in quadrant IV. The motor, for most steering operations, is operating in either quadrants I or III.

Each of the sets of ten current profile tables is, itself, partitioned into four tables, i.e., each phase, for a particular torque level, has its own associated torque table. For a particular motor, the current values for any particular phase relative to rotor position would not be the same for quadrant I (positive rotation with positive command) as it would be for quadrant III (negative rotation with negative command) operation. However, it is possible to use the same set of torque tables independent of quadrant I or III operation if gain balancing is utilized.

To use a single set of tables to command both quadrant I and III operation, in accordance with the present invention, four current profile tables are stored for each of the 10% torque levels. Consider for the purposes of explanation, only one of the torque levels. The four torque tables for that torque level are referred to as $T_1$, $T_2$, $T_3$, and $T_4$. This nomenclature is used to distinguish between the four different profile tables and does not indicate a phase that is to be commanded with a selected one of the profile tables. To define what table is used to command what phase, for the purposes of explanation, the table is put in parenthesis after the phase, e.g., $A(T_1)$ indicates table $T_1$ is used to command phase A, $C(T_2)$ indicates that table $T_2$ is used to command phase C, etc.

Figures 4A, 4C:
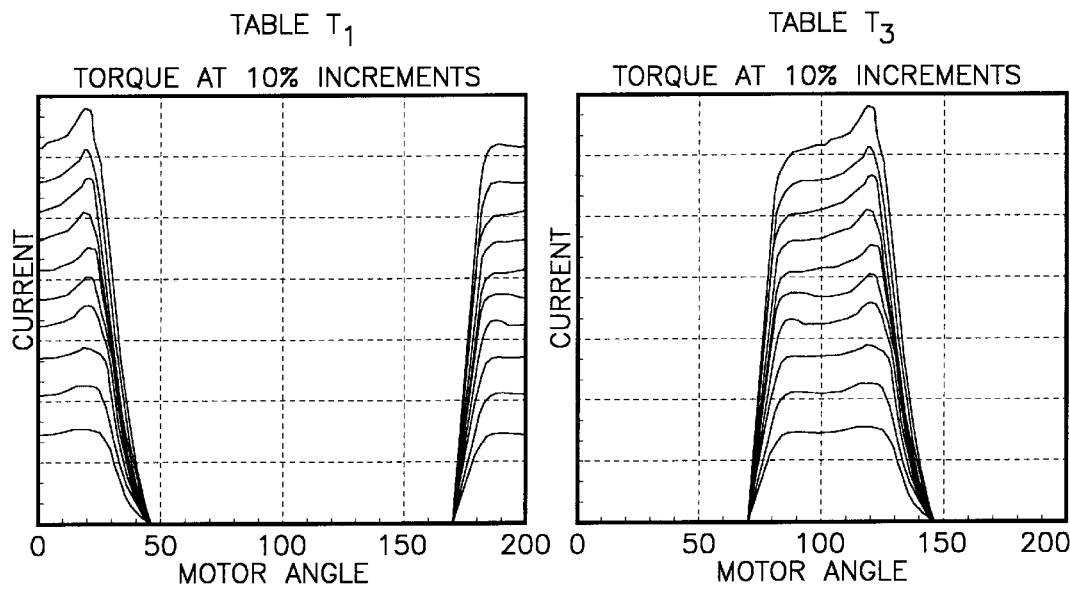
FIGS. 4A–4D are graphical representations of current control values stored in a look-up table for incremental torque values for the four motor phases.
Figures 4B, 4D:
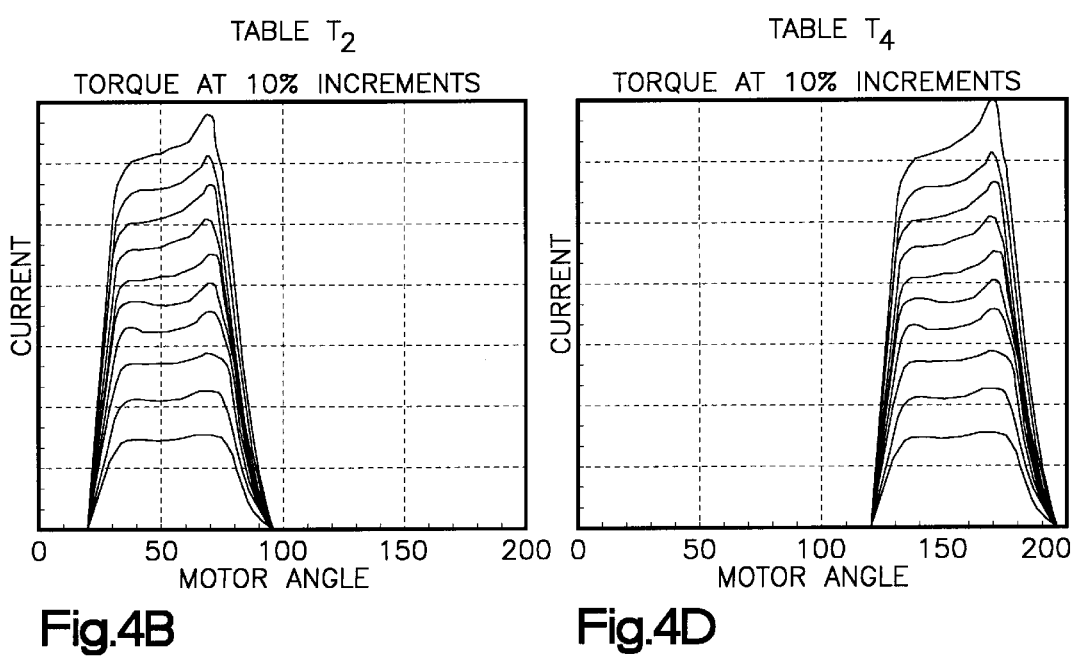

A typical set of profile tables is shown in FIGS. 4A–4D. There are 10 traces on each plot representing 10 incremental levels of possible torque commands $\tau_{cmd}$, i.e., 10%, 20%, 30%, etc. The x-axis is the electrical angle that is used to index into the tables and the y-axis is the motor command current in amps. Although each of the 10% current profile tables are depicted as continuous curves, each 10% table has 200 finite stored current control values, one for each $\frac{1}{200}^{th}$ of an electrical angle. Therefore, large portions of each table contains zeros. For example, table $T_2$, FIG. 4B, is non-zero only for motor angles $\theta$ where $20<\theta<95$. The non-zero values are discrete points that are the bases for the continuous curves depicted.

Figure 5:
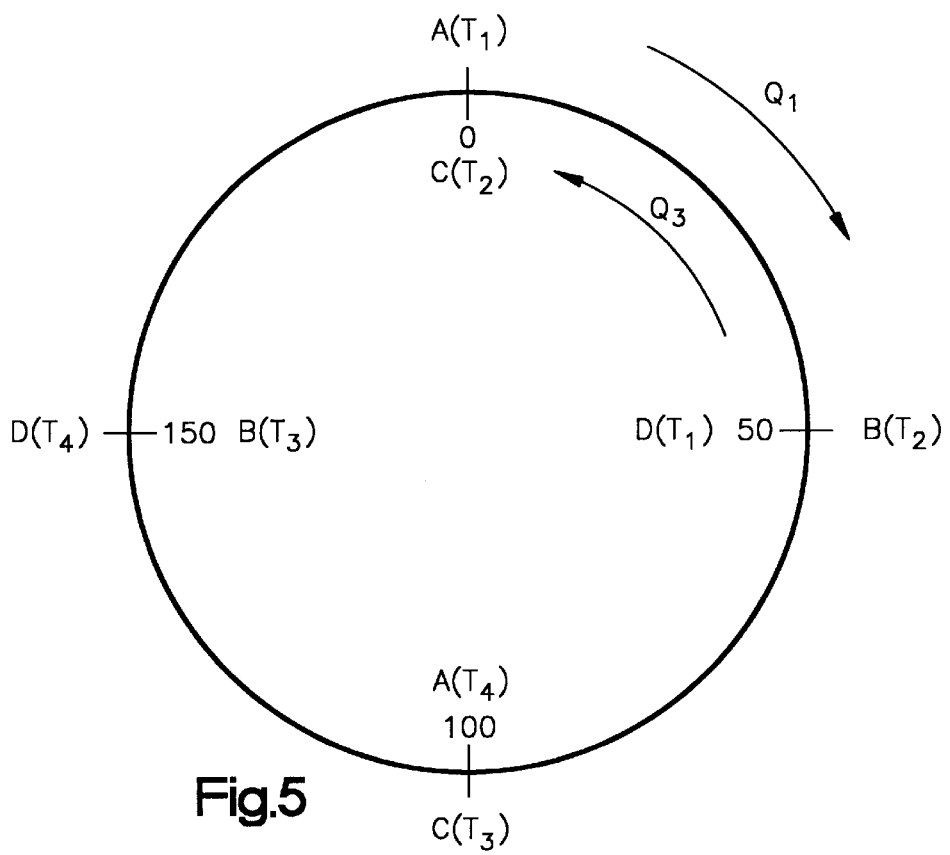
FIG. 5 is a graphical depiction of the selection process of look-up tables as a function of electrical angle and the motor operating quadrant.

Referring to FIG. 5, it will be appreciated how the profile tables are used to command the motor phases when the motor is operating in quadrants I and III. The large circle represents electrical angle. Once around the circle is a single electrical cycle, i.e., 360 electrical degrees or 60 mechanical degrees. The clockwise direction is for increasing angle or positive rotor direction and the counter-clockwise direction is for decreasing angle or negative rotor direction. The angles shown are θ=0, θ=50, θ=100, and θ=150. These angles correspond to the rotor positions when phases D, A, B, and C are aligned respectively.

For the purpose of explanation, assume that the initial rotor angle is θ=0. To rotate the motor in a positive (clockwise) direction, the motor is commanded with the sequence: $A(T_1) \rightarrow B(T_2) \rightarrow C(T_3) \rightarrow D(T_4)$. This sequence corresponds to the motor operating in the quadrant I since the motor rotor direction and the torque are both positive, i.e., the motor is commanded to move clockwise and is, in fact, moving clockwise. To rotate the motor in a negative (counterclockwise) direction, the motor is commanded with the sequence: $C(T_2) \rightarrow B(T_3) \rightarrow A(T_4) \rightarrow D(T_1)$. This sequence corresponds to the motor operating in the quadrant III since the motor rotor direction and the torque are both negative, i.e., the motor is commanded to move counterclockwise and is, in fact, moving counterclockwise. Both of these sequences are indicated in FIG. 5 by moving around the circle in either a clockwise (quadrant I or $Q_1$) direction or a counterclockwise direction (quadrant III or $Q_3$) direction.

To understand why different tables are used to command the same phases for different quadrant operation, three principles must be appreciated. First, the phase energizing sequence for quadrants I and III operation is defined by the construction of the motor. Second, the tables used to command the transition between phases A and D must be the same in both quadrants I and III. Third, the four current profile tables must be passed through in the same order whether in quadrants I or III.

At any given angle, opposite polarity torques are achieved by energizing phases that are 180 electrical degrees apart. At 0 electrical degrees, phase A generates positive torque and phase C generates negative torque. At 100 electrical degrees, phase C generates positive torque and phase A negative torque. If the phases are energized in the sequence ABCD, the motor will rotate in the positive direction. If the phases are energized in the sequence CBAD, the motor will rotate in the negative direction. Therefore, the location of the phases with respect to the angles on the inside and outside of the circle, i.e., the required angles and sequence for quadrants I and III, are dictated purely by the motor construction.

Figure 6:
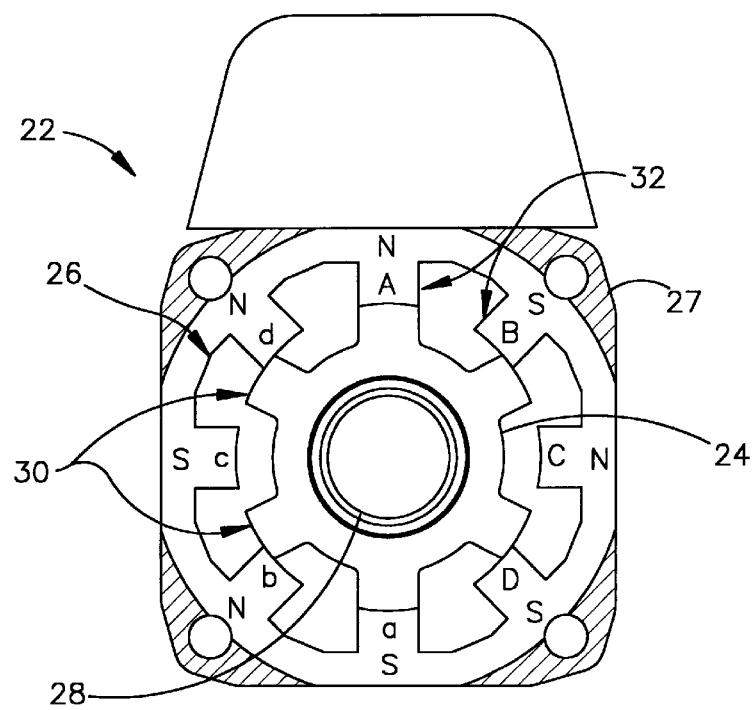
FIG. 6 is a cross-sectional view of a variable reluctance motor similar to FIG. 2 showing the magnetic polarity of each of the motor phase coils during stator energization.

The VR motor current to torque gain is different in the D to A transition than in all other transitions because magnetic field structure is different in the region. Referring to FIG. 6, the magnetic polarity of each of the motor phase coils are shown. When current is in Phases AB, BC, and CD simultaneously, the magnetics are such that very little flux sums in the back iron as the flux lines flow from North to South. However, in the AD transition, the flux lines flow in the same direction in the back iron thereby increasing saturation and reducing the amount of incremental torque for an incremental current change. To account for this physical difference in the motor, the current commands in tables $T_1$ and $T_4$ within the D to A transition are different than the other three transitions. Generally, higher currents are required in the $T_1$ and $T_4$ tables to achieve the same torque as in the other transitions. In quadrant I, the D to A transition is commanded as $D(T_4) \rightarrow A(T_1)$. Since the tables $T_1$ and $T_4$ are used in quadrant I, they must also be used in quadrant III. One solution is to command the transition as $A(T_4) \rightarrow D(T_1)$ when in quadrant III. An assumption is that the torque in quadrant I produced by $A(T_1)$ and $D(T_4)$ is the same as the torque produced in quadrant III for $A(T_4)$ and $D(T_1)$.

The four current profile tables must be passed through in the same order whether in quadrants I or III. The definition of the quadrants I and III are arbitrary to the external observer. If a given table commanding sequence is used in quadrant I, a transformation can be performed to the measured motor angle to allow the same table commanding sequence to be used in quadrant III. A simple transformation that meets this requirement when in quadrant III is $\theta_{Q3}= 50-\theta_{meas}$ where $\theta_{meas}$ is the measured motor angle and $\theta_{Q3}$ is the angle that is used to index into the tables when in quadrant III.

In quadrant I, the motor angle Omeas is used to directly look up the current command, the motor rotor direction is positive, and $\theta_{meas}$ is increasing positively. In quadrant III, the transformed motor angle $\theta_{Q3}$ is used to look up the current commands, the motor rotor direction is negative, yet $\theta_{Q3}$ is also increasing positively. Therefore, applying this transformation satisfies the above constraint of passing through the tables in the same order because the indices in the tables $\theta_{meas}$ and $\theta_{Q3}$ are both increasing in quadrants I and III, respectively. Not only does this transformation allow the tables to be indexed through in the same order, whether in quadrants I or III, it also satisfies the constraint of keeping tables $T_1$ and $T_4$ in the A to D transition.

For example, consider a motor operating in quadrant III at $\theta_{meas}$=75 deg. From the transformation above, $\theta_{Q3}$=−25 deg. or 175 deg. The angle of $\theta_{Q3}$=175 deg. is used as an index to look up the current command value in all the look-up tables. It happens that only $T_1$ and $T_4$ have non-zero current command values for $\theta_{Q3}$=175 deg. From FIG. 5, looking at the inside of the circle, the current command from table $T_4$ is applied to phase A and the current command from table $T_1$ is applied to phase D. If the motor is operating in quadrant I and $\theta_{meas}$=75 deg., the current commands are looked up using the index of $\theta_{meas}$=75 deg. Only $T_2$ and $T_3$ have non-zero current commands at this position. For motor operation in quadrant I, the current command from $T_2$ is applied to phase B and the current command from $T_3$ is applied to phase C.

The assumption that the torque in quadrant I by $A(T_1)$ and $D(T_4)$ is the same as the torque produced in quadrant III for $A(T_4)$ and $D(T_1)$ can be made due to motor construction. Motor torque can be represented by $\tau_{Q1}(\theta)=-\tau_{Q3}(50-\theta)$. If the motor is in quadrant I and rotates from 150 deg. to 0 deg., the torque produced shall be the same magnitude but of opposite polarity as the torque produced in quadrant III when rotating from 100 deg. to 50 deg. The angle θ is referenced to quadrant I. If θ=150 deg, $\tau_{Q1}$ occurs at a mechanical angle of 150 deg. and $\tau_{Q3}$ occurs at a mechanical angle of 100 deg.

The torques produced for $\tau_{Q1}(\theta)$ and $\tau_{Q3}(50-\theta)$ are:

$$\tau_{Q3}(50-\theta)=\tau[A(T_4(\theta))+D(T_1(\theta))]$$

$$\tau_{Q1}(\theta)=\tau[D(T_4(\theta))+A(T_1(\theta))]$$

where $\tau_{Q1}(\theta)$ and $\tau_{Q3}(50-\theta)$ are the torques produced at angle for the current as specified in the tables. Note that the θ torques in these equations are nonlinear functions of three variables: the motor angle, the current in phase A, and the current in phase D. If these equations are linerized about the operating points θ, $T_1(\theta)$, $T_4(\theta)$, and the partial derivative of the torque with respect to the angle θ is neglected by assuming that position information is perfect, the incremental torques are:

$$\delta\tau_{Q1}(\theta)=K_D(\theta)\times\delta T_4(\theta)+K_A(\theta)\times\delta T_1(\theta)$$

$$\delta\tau_{Q3}(50-\theta)=[K_A(50-\theta)\times\delta T_4(\theta)+K_D(50-\theta)\times\delta T_1(\theta)]$$

where $K_D$ and $K_A$ are the partial derivatives of the torque with respect to the currents evaluated at $[\theta, T_1(\theta), T_4(\theta)]$, and $\delta T_1$, $\delta T_4$ are the perturbations in current from the defined profile tables. The reason the gains $K_A$ and $K_D$ are referenced to $(50-\theta)$ rather than $(\theta)$ in the one equation above is that the gains must be calculated at the physical rotor position while the tables are always referenced to a $Q_1$ angle. Since the rotor is at $(50-\theta)$ where $\theta$ is a $Q_1$ angle, the partial derivative of the torque with respect to current must be evaluated at the rotor angle $(50-\theta)$, and the delta currents $\delta T$ must be referenced to the pretransformed $Q_1$ angle θ. Substituting the results into the motor torque production equation above yields:

$$K_D(\theta)\times\delta T_4(\theta)+K_A(\theta)\times\delta T_1(\theta)=-[K_A(50-\theta)\times\delta T_4(\theta)+K_D(50-\theta)\times\delta T_1(\theta)]$$

rearranging this equation yields:

$$[(K_D(\theta)+K_A(50-\theta)]\times\delta T_4(\theta)+[K_A(\theta)+K_D(50-\theta)]\times\delta T_1(\theta)=0$$

One solution to this equation is for the delta currents to be zero. However, this would be a trivial solution. This equation needs to satisfy the original transformation equation in the presence of current perturbations. For a given current perturbation, the torque ripple in quadrants I and III must satisfy the transformation equation. The only solution that satisfies both the transformation equation and the last equation is if the multipliers of the terms $\delta T_1$ and $\delta T_4$ are zero. The last equation is valid so long as:

$$K_D(\theta)+K_A(50-\theta)=0$$

$$K_A(\theta)+K_D(50-\theta)=0$$

These equations are the physical constraints that allow the single set of tables to be used in quadrant I ($Q_1$) and quadrant III ($Q_3$). The torque that a motor generates in quadrant I is the same as the torque generated in quadrant III when the transformation $$\tau_{Q1}(\theta)=-\tau_{Q3}(50-\theta)$$

is used. These constraints must be met when the motor is built.

The interpolation circuit 74 determines the position of the rotor 24 from the position sensor signal 75 output from position sensor 73 and monitors the torque command signal $\tau_{cmd}$. Since the current profile tables can only store a finite number of values, the actual current control value that is to be output from the circuit 74 is interpolated. Preferably, the interpolation is accomplished as is fully described in the above-incorporated U.S. Pat. No. 5,475,289 to McLaughlin et al.

Basically, the interpolation is accomplished by determining between which of two stored current profile tables the torque command $\tau_{cmd}$ lies. For example, if $\tau_{cmd}=35\%$ (i.e., 35% of the maximum expected applied steering torque from the motor 22), the interpolation circuit 74 determines the torque command lies between the 30% and 40% current profile tables associated with those torque levels. The interpolation circuit 74 next determines between which two stored rotor position values the rotor position lies. The interpolation circuit 74 then interpolates a current control value between the stored rotor positions for each of the stored torque curves to determine two current command values, one from the 30% torque table and one from the 40% torque table. Based on the interpolation between the current profiles and the rotor positions, the current command $I_{cmd}$ is interpolated between the two current values. The current command $I_{cmd}$ for the Phases A, B, C, and D are referred herein as $I_{acmd}$, $I_{bcmd}$, $I_{ccmd}$, and $I_{dsmd}$, respectively.

The current commands determined by the interpolation circuit 74 are output to a gain controller 78. The filtered torque ripple estimator vector value $\tau_{ftre}$ is connected to a gain controller 78. The gain controller 78 multiplies the current command value output from the interpolation circuit 74 for a particular motor phase by a gain multiplier value associated with that motor phase to yield a final motor current control value for each phase.

The gain multipliers for Phases A, B. C, and D are referred to herein as $G_a$, $G_b$, $G_c$, and $G_d$, respectively. The current control values for Phases A, B, C, and D are given by the products $G_aI_{acmd}$, $G_bI_{bcmd}$, $G_cI_{ccmd}$, and $G_dI_{dcmd}$, respectively. The values for the gain multipliers are determined by the gain controller 78 in response to the total filtered torque ripple estimate vector $\tau_{ftre}$. Initially, each of the four gain multipliers is set equal to one.

The current control values output from the gain controller 78 are used as command signals for a closed loop current controller 79. The closed loop current controller uses both the sensed current in the motor 22 and the current control values output from the gain controller 78 for control of the motor current in a closed loop fashion for each motor phase using pulse-width-modulation ("PWM"). The PWM signals control applied current to the motor 22 which, in turn, controls the output torque developed by the motor 22.

The torque ripple controller 72 monitors the torque request value 69, the motor rotor position signal 75, and measured motor torque $\tau_{meas}$ and, in response thereto, determines a filtered torque ripple estimate vector $\tau_{ftre}$ having 200 component points. Each component value of the vector $\tau_{ftre}$ is designated $\tau_{ftre}(i)$, where i is an index value which corresponds to an associated rotor electrical angle. Recall that the filtered torque ripple estimate value is also referred to as the feed-forward torque value. The index value i varies from 1 to 200, which means there are 200 estimates of feed-forward torque $\tau_{ftre}(i)$ for one electrical cycle of the rotor 24.

The value of each feed-forward component $\tau_{ftre}(i)$ is the average of the measured torque ripple over the angular interval $i+0.5>\theta>i-0.5$, where θ is the measured electrical angle.

In accordance with the present invention, a torque ripple estimate that is a function of the motor electrical angle $\tau_{ftre}(\theta)$ is computed. This vector value is added to the desired torque request $\tau_{req}$ to arrive at the torque command value $\tau_{cmd}$. The torque command value $\tau_{cmd}$ is varied with electrical angle such that the measured torque $\tau_{meas}$ from the motor is identically equal to the requested torque $\tau_{req}$ at all electrical angles.

The filtered torque ripple estimate value $\tau_{ftre}$ is computed using the following process:

(1) Choose a spatial frequency below which all torque ripple is to be removed. Spatial frequency has units of cycles per electrical cycles. Spatial frequencies also corresponds directly to motor control phenomena. For example, there are four phases in the preferred motor arrangement. Therefore, there are four commutation regions within each electrical cycle, i.e., each one of the four phases is turned ON during an electrical cycle. The spatial frequency of N=4 corresponds to the commutation frequency. It has been discovered that reducing all motor torque ripple below N=16 cycles/electrical cycles is sufficient to produce motor operations that is satisfactory in a steering system. Therefore, N is set equal to 16.

(2) Map the spatial frequency to a time domain frequency assuming a constant motor speed. In the accordance with the preferred embodiment of the present invention, the constant motor speed is chosen to be 20 rpm. Because the motor is rotating at a constant motor speed, there is a one-to-one map between spatial frequencies and time domain frequencies. The following equation is used.

$$\omega_t = \frac{\omega_m}{10} N$$

where:

N=spatial frequency (cycles/electrical cycles)

$\omega_t$=time domain frequency (Hz), and $\omega_m$=motor rotor speed (rpm).

For example, an 8/6 motor has 24 commutations per revolution. If the motor is rotated at 1 revolution per second, the commutation frequency will be at 24 Hz, i.e., 24 commutations per second. Using the above equation, if N=4 and $\omega_m$=60 rpm (1 revolution/second), then $\omega_t$=24 Hz. If N=16 cycles/electrical cycle and $\omega_m$=20 rpm, then $\omega_t$=32 Hz. Application of this ripple reduction algorithm will effectively eliminate torque ripple below 16 cycles/electrical cycles and 32 Hz.

(3) Filter the measured motor torque $\tau_{meas}$ through a time domain digital filter 81 with a break frequency defined by the above equation for $\omega_t$. If N=16 and $\omega_m$=20 rpm, the torque filter break frequency is $\omega_t$=32 Hz. In accordance with a preferred embodiment of the present invention, a $6^{th}$ order Butterworth filter is used. Attached as appendix A of this application is the source code listing for this filter. This filter prevents signal aliasing.

(4) Compute the average of the filtered torque as:

$$\tau_{ave}(j) = \sum_{i=1}^{m} \tau_f(nT)$$

where $(j-0.5) \leq \theta_i \leq (j+0.5)$, j=1,200 and $\theta$ is the measured rotor angle in units of electrical degrees in an averaging function 82.

(5) Anticausally filter the average torque from the above equation through a spatial filter (anticausal filter 83) with equivalent frequency domain characteristics as the time domain filter above. The spatial filter has a break frequency of N=16 cycles/electrical cycles in the preferred embodiment. The source code to accomplish the anticausal filtering of the torque is attached as subroutine anti_filt in Appendix A. For purposes of explanation, the anticausally filtered torque ripple estimate components are designated as $\tau_{filt}(i)$, i=1,200.

A standard causal filter inherently introduces increasing phase lag as the slope of the filter's gain reduction is increased. In contrast, in accordance with the present invention, the gain and phase are decoupled in the anticausal filter 83. This arrangement provides attenuation via the filter gain without introducing any phase lag.

The anticausal filter 83 derives its name from the fact that time is "reversed" to achieve filtering without a phase lag with respect to the original measured torque $\tau_{meas}$. The spatial filter recovers the phase lag induced by the time domain filter. Since time cannot literally be "reversed" in a causal filter, the name anticausal is used to describe this type of filter. The anticausal filter 83 is preferably implemented in software in the torque ripple controller 72 using the source code set forth in Appendix A. Preferably, the torque ripple controller 72 is a microcomputer.

The Z-domain cutoff frequency of the spatial filter must be defined. For present application, the pole of the filter is specified as a spatial frequency in units of cycles per electrical cycles. That is, the operator specifies the spatial frequency above which no energy passes in units of cycles per electrical cycles. Spatial frequencies, as opposed to time domain frequencies, are convenient to use with variable reluctance motors because they do not change with motor rotor direction.

As mentioned, Appendix A is a software program listing showing a software implementation of the anticausal filter 83 in accordance with a preferred embodiment of the present invention. The program listing is but one way of accomplishing the anticausal filtering process of the present invention and should not be viewed as a limitation of the present invention.

It has been found that the majority of the torque ripple occurs in a variable reluctance motor having eight stator poles, six rotor poles at below 16 cycles per electrical cycles. Therefore, the pole of the filter is set to 16 cycles per electrical cycles. The anticausal filter is discrete, therefore, the pole is mapped to the Z-domain. Since there are 200 points in the vector $\tau_{ftre}$ which are to be filtered and the vector has an angular length of one electrical cycle, this is equivalent to 200 samples/electrical cycle. If s is the spatial frequency in units of cycles per electrical cycles (16 for this preferred embodiment) and T is the sample rate in units of electrical cycles (1/200 for this preferred embodiment), then the Z-domain pole is computed as $$z = e^{-2\pi s T}$$

In a preferred embodiment, s=16 cycles/electrical cycles, and T=(1/200) electrical cycles. Then z=0.605.

The ripple controller 72 adds the output $\tau_{filt}(i)$ of the anticausal filter 83 to a filtered torque ripple estimate vector $\tau_{ftre}$. The total torque ripple estimate vector $\tau_{ftre}$ is given by the equation:

$$\tau_{ftre}(i) = \tau_{ftre}(i) + K^* \tau_{filt}(i), \text{ for } i=1,200$$

where K is a gain value between 0 and 1. The effect of the gain K is that only a percentage of the output $\tau_{filt}(i)$ is added to the existing total torque ripple estimate vector $\tau_{ftre}$. Adding only a percentage of output $\tau_{filt}(i)$ allows for slow convergence of the vector $\tau_{ftre}$ in case non-linear effects become dominant. All 200 components of the vector $\tau_{ftre}$ are zero the first time through the algorithm. In a preferred embodiment, K=0.9 for torque levels greater than 10% and is equal to 0.5 for torque levels less than 10%.

As mentioned above, the filtered torque ripple estimate vector $\tau_{ftre}$ is provided to the summing circuit 70. The first time through the determination process all components of the vector $\tau_{ftre}$ equal zero so the torque command $\tau_{cmd}$ equals the torque request $\tau_{req}$. When the vector $\tau_{ftre}$ is non-zero, however, the torque command $$\tau_{cmd} = \tau_{req} + \tau_{ftre}(i) \text{ for } i+0.5 \leq \theta > i-0.5$$

where $\theta$ is the position of the rotor 24. Each component of the vector $\tau_{ftre}$ is termed a feed-forward ripple estimate because for a rotor position θ such that i+0.5≦θ>i−0.5, the component $\tau_{ftre}$ is summed to the torque request $\tau_{req}$. In other words, the component $\tau_{ftre}(i)$ is used to adjust the torque request $\tau_{req}$ over the angular interval i+0.5≦θ>i−0.5.

The torque ripple controller 72 updates the total torque ripple estimate vector $\tau_{ftre}(i)$ until the controller 72 determines the vector is "acceptable." An acceptable vector occurs when the ripple of the motor 22 is less than a predetermined threshold. For a variable reluctance motor to be used in an electric steering system, this torque ripple threshold is less than or equal to 1 in-lb. The peak-to-peak torque ripple is defined by the maximum minus the minimum torque measured by the torque sensor 36 over one mechanical revolution of the rotor 24.

Once the ripple controller 72 that determines the peak-to-peak torque ripple is acceptable, it communicates this fact via an evaluation signal 84 to the gain controller 78. The evaluation signal 84 has a digital "HIGH" value when the controller 72 has determined the peak-to-peak torque ripple is acceptable, and a digital "LOW" otherwise. When the gain controller 78 receives a digital HIGH evaluation signal 84, it performs gain balancing of the filtered torque ripple estimate vector $\tau_{ftre}$. Gain balancing ensures that the estimate vector $\tau_{ftre}$ is at the same level for all four motor phases when only one motor phase is energized.

Figure 7:
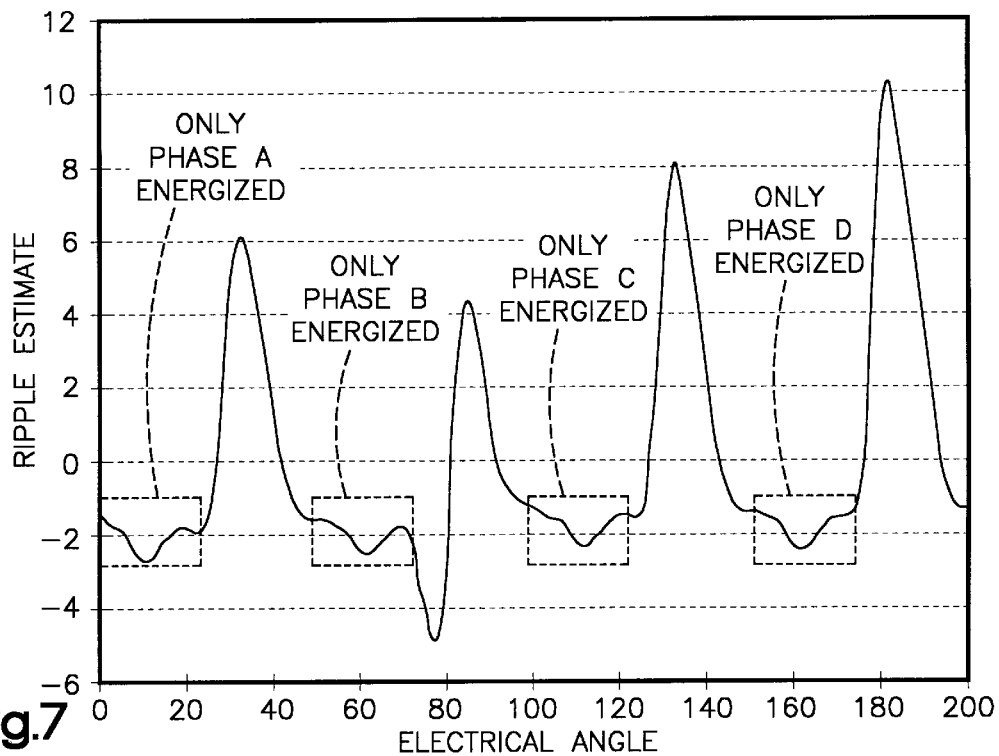
FIG. 7 is a graph diagram showing the effect that gain balancing the torque ripple estimate has on motor torque ripple.

FIG. 7 shows that when the filtered ripple estimate vector $\tau_{ftre}$ is gain balanced, the same levels of torque ripple occur when only a single phase is energized. The X-axis represents the electrical angle and the Y-axis represents the component values of the total torque ripple estimate vector $\tau_{ftre}$. In a preferred embodiment, the current profile tables are defined such that for electrical angles from 1 to 20, only Phase A is energized. For electrical angles from 51 to 70, only Phase B is energized. Similarly, Phase C only is energized for electrical angles from 101 to 120 and Phase D only is energized for electrical angles from 151 to 170.

The gain controller 78 performs gain balancing by determining a gain multiplier for each motor phase. To determine the gain multipliers, the controller 78 first calculates a local gain for each phase. The local gain of each phase is defined as the average torque ripple over the interval of angles when only that phase is energized. The equations evaluated by the controller 78 to calculate the local gains are:

| | |
|---|---|
| $G_{aloc} = \Sigma(\tau_{ftre}(i) - mean(\tau_{ftre}))/20$ for i = 1, 20 | Phase A |
| $G_{bloc} = \Sigma(\tau_{ftre}(i) - mean(\tau_{ftre}))/20$ for i = 51, 70 | Phase B |
| $G_{cloc} = \Sigma(\tau_{ftre}(i) - mean(\tau_{ftre}))/20$ for i = 101, 120 | Phase C |
| $G_{dloc} = \Sigma(\tau_{ftre}(i) - mean(\tau_{ftre}))/20$ for i = 151, 170 | Phase D |

The controller 78 next determines a gain balance term for the Phases A, B, C, and D in accordance with the following equations:

| | |
|---|---|
| $G_{abal} = 1$ | Phase A |
| $G_{bbal} = 1 - (G_{Aloc} - G_{Bloc})/\tau_{cmd}$ | Phase B |
| $G_{cbal} = 1 - (G_{Aloc} - G_{Cloc})/\tau_{cmd}$ | Phase C |
| $G_{dbal} = 1 - (G_{Aloc} - G_{Dloc})/\tau_{cmd}$ | Phase D |

The gain balance terms for the Phases B, C, and D are normalized to the local gain of Phase A. Each gain balance term may be thought of as a percentage error with respect to the torque command $\tau_{cmd}$. Finally, the controller 78 determines the gain multiplier for each phase in accordance with the following equations:

$$G_{amult} = G_{abal} = 1$$

$$G_{bmult} = G_{bmult} * G_{Bbal}$$

$$G_{cmult} = G_{cmult} * G_{Cbal}$$

$$G_{dmult} = G_{dmult} * G_{Dbal}$$

where the initial value of each gain multiplier is one. Having calculated the gain multipliers, the controller 78 then utilizes these multipliers to adjust the current commands provided by the interpolation circuit 74. The gain multiplier values and the torque ripple estimate vectors are then stored for a particular motor 22 under calibration in the look-up tables 67 of the electric assist steering controller 66 that will be associated with that motor.

Those skilled in the art will appreciate that gain balancing is only required if the table computed for quadrant I is to be also used for quadrant III. If the tables are not to be shared, i.e., each quadrant has its own set of tables for the four phases, gain balancing is not required.

Figure 8:
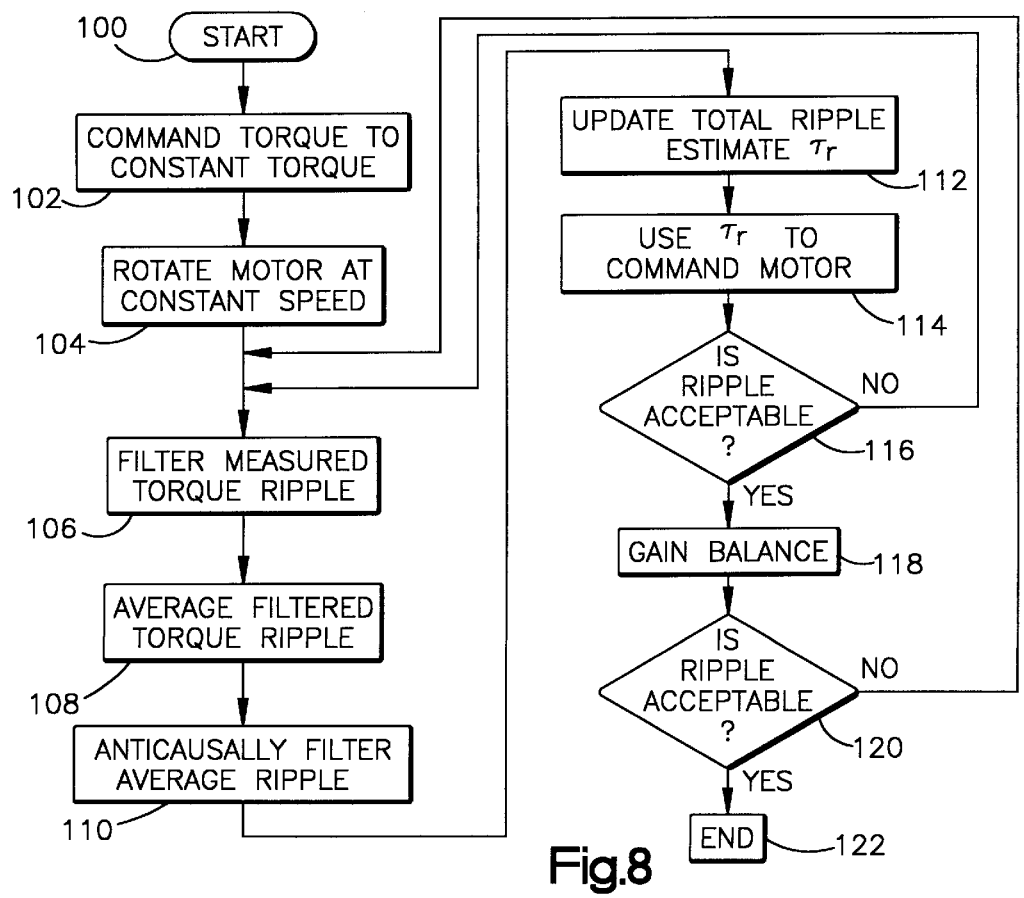
FIG. 8 is a flow chart of the control process of the present invention.

Referring to FIG. 8, a flow chart is shown depicting the control process, in accordance with the present invention, for reducing torque ripple in an electric motor. The process starts in step 100 and proceeds to step 102. In step 102, the motor 22 is commanded with a constant torque request value $\tau_{req}$. From step 102, the process goes to step 104. In step 104, current is provided to the motor 22 to cause the motor to develop the torque request $\tau_{req}$ at a constant rotor speed. The process then goes to step 106.

In step 106, the measured torque ripple is filtered in the time domain. The process then proceeds to step 108 where the filtered torque is averaged over all electrical angles. From step 108, the process goes to step 110.

In step 110, the process anticausally filters the averaged torque ripple in the spatial domain. The anticausal filter recovers the phase lag incurred by the time domain filtering performed in step 106. Thereafter, the process goes to step 112. In step 112, the anticausally filtered torque ripple is added to the filtered torque ripple vector $\tau_{ftre}$. Each cycle through the process, the averaged time domain filtered torque ripple determined during that cycle is used to update the anticausally filtered torque ripple estimate vector $\tau_{ftre}$.

The process goes from step 112 to step 114, wherein the filtered torque ripple estimate vector $\tau_{ftre}$ is used in commanding the motor. In other words, at a given position of the rotor 24, the component $\tau_{ftre}(i)$ corresponding to that rotor position is summed with the torque request $\tau_{req}$ to yield the torque command $\tau_{cmd}$. The torque command $\tau_{cmd}$ is provided to the interpolation circuit 74, which determines the current to be supplied to the motor 22 from that torque command. The process then goes to step 116.

In step 116, the process determines whether the torque ripple of the motor 22 is acceptable. As previously described, the torque ripple is acceptable when the ripple is less than a predetermined threshold. If the torque ripple is not acceptable, the process goes back to step 106. The process executes steps 106 through 116 until the vector $\tau_{ftre}$ is acceptable. Once the inquiry in step 116 is affirmative, the process goes to step 118.

In step 118, the vector $\tau_{ftre}$ is gain balanced (if needed) to assure the same amount of torque ripple is present when any of the phases A, B, C, or D is solely energized. From step 118, the process proceeds to step 120 where it is once again determined whether the torque ripple is acceptable. If the determination in step 120 is negative, the process goes back to step 106. The process executes steps 106 through 120 until the gain balanced vector $\tau_{ftre}$ is such that the torque ripple is acceptable. Once step 120 determines the torque ripple is acceptable, the process is complete and it goes to step 122 and ends.

The above process is repeated at each 10% torque level in each of the four operating quadrants of the motor. As mentioned, these four quadrants are:

Quadrant I ($Q_1$): positive motor torque, positive motor rotation.

Quadrant II ($Q_2$): positive motor torque, negative motor rotation.

Quadrant III ($Q_3$): negative motor torque, negative motor rotation.

Quadrant IV ($Q_4$): negative motor torque, positive motor rotation.

At each 10% torque level for each operating quadrant, the feed-forward torque vectors $\tau_{ftre}$ and the gain balance terms are stored.

The current profile tables for storage in the look-up tables 67 of controller 68 for each of the motor quadrants are determined as follows:

(1) Disable the motor current controller so that the motor phases are not energized.

(2) Set the motor request $\tau_{req}$ equal to 10% of full torque.

(3) At each motor angle from 1 to 200, compute the motor command and the corresponding currents for each motor phase. The command is the sum of the requested torque $\tau_{req}$ and the feed-forward torque $\tau_{ftre}$ at each motor angle.

(4) Store each of the computed motor currents in memory.

(5) Increment the requested torque by 10%.

(6) If the requested torque commanded is less 100%, return to step (3).

(7) Store all newly computed current commands at each angle and at each 10% torque level command in the current profile tables 67 in controller 66.

It has been discovered that the gain balance terms for a single phase are nearly equal at all torque levels. In accordance with a preferred embodiment, the gain balance terms for the 50% torque level are used for all other torque levels. Thus any torque ripple that is present at the 50% torque level is minimized. Preferably, the gain balance term is selected for the torque level where the motor is mainly used. For example, if the motor is mainly drive at a 60% torque level, the gain balance terms for the 60% level would be used for all the other torque levels. As mentioned above, if separate tables are stored in memory 67 for each of the four motor operating quadrants of the motor, gain balancing terms are not required since tables generated for each of the four quadrants, in accordance with the present invention, will be substantially ripple free.

The above described system has computed the feed-forward torque $\tau_{ftre}$ for electrical cycles with the assumption that all electrical cycles produce torque identically the same. Although this is a good assumption, there can be some variance in the actual torque produced during the electrical cycles. For example, if the motor exhibits a 1–2 in-lb torque variation between electrical cycles, this torque ripple will still be present even after using the above-described ripple reduction process. If, however, the feed-forward torque is determined in accordance with the mechanical motor angle, the motor output torque ripple can be made equal to the noise floor of the system within a specified frequency range.

In accordance with another embodiment of the present invention, the average (time domain) and anticausally (spatial domain) filtered torque vector is computed based on mechanical revolution rather than electrical revolution. In this way, it is no longer necessary to assume that each electrical cycle produces torque in the same fashion. By computing feed-forward torques based on motor mechanical angle, torque ripple can be reduced to less than 0.5% peak-to-peak of full motor output torque.

From the above description of the invention, those skilled in the art will perceive improvements, alternatives, and modifications. Such improvements, alternatives, and modifications and equivalents thereof within the skill of the art are intended to be covered by the appended claims.

APPENDIX A

```
void butter_filt0
{
/*============================================================
    This routine implements an Nth order butterworth filter. The s-domain
    poles are mapped to the z-domain using Tustin's rule. The inputs and
    outputs are:
        inputs:      butter_first    Input flag used to initialize
                                     the filter. Set =1 to
                                     initialize the filter and/or to
                                     compute new filter coefficients
                                     due to the break frequency of
                                     the filter changing.
                     anti_pole       The spatial break frequency for
                                     the filter. Generally,
                                     anti_pole is set to 16 cycles
                                     per electrical cycle.
                     motor_rpm       The motor rotational rate in
                                     units of rpm.
                     torque_meas     The measured motor torque.
        outputs: torque_meas_filt    The filtered motor torque.
============================================================*/
    float   tmp1, tmp2, tmp3, tmp4, alpha;
    float   zeta[5];
    float   freq[5];
    long    i_butter, j_butter, kkk;
/*      Calculate all coefficients if butter_first=] */
        if(butter_first=1)
        { butter_first=0;
                butter_wn=fabs(anti_pole/(10.0/rpm_setpnt));
                        butter_first = 1;
                    for(j_butter=0; j_butter<6; j_butter++)
                    {/*Modified the initialization to set past filter states to
                     the filtered torque.
                        butter_yn[j_butter]=0.0;
```

APPENDIX A-continued

```
                butter_ynmin1[j_butter]=0.0;
                butter_ynmin2[j_butter]=0.0;
                */
            butter_yn[j_butter]=torque_meas_filt;
            butter_ynmin1[j_butter]=torque_meas_filt;
            butter_ynmin2[j_butter]=torque_meas_filt;
        }
butter_npoles=3;
zeta[0]=sin(45.0*PI/180.0);
freq[0]=butter_wn*2.0*PI;
zeta[1]=sin(75.0*pi/180.0);
freq[1]=butter_wn*2.0*PI;
zeta[2]=sin(15.0*PI/180.0);
freq[2]=butter_wn*2.0*PI;
/*  Compute the coefficients for the filter. The filters are set up as 3
        separate bi-quads*
            for(i_butter=1; i_butter<butter_npoles+1; i_butter++)
            {
             tmp1=(freq[i_butter-1]*cycle_time)*(freq[i_butter-1]*cycle_time);
             tmp2=4.0*(1.0+zeta[i_butter-1]*freq[i_butter-1]*cycle_time)+tmp1;
             tmp3=2.0*tmp1-8.0;
             tmp4=4.0*(1.0zeta[i_butter-1]*freq[i_butter-1]*cycle_time)+tmp1;
             butter_a[i_butter]=tmp1/tmp2;
             butter_b[i_butter]=tmp3/tmp2;
             butter_c[i_butter]=tmp4/tmp2;
            }
            flag+=0;
        }
/*Assign butter_yn the input measured torque. */
  butter_yn[0]=torque_meas;
  for(j_butter=1; j_butter<butter_npoles+1; j_butter++)
  {
        butter_yn[j_butter]=butter_b[j_butter]*butter_ynmin1[j_butter]+
butter_c[j_butter]*butter_ynmin2[j_butter]
            +butter_a[j_butter]*(butter_yn[j_butter-1]+2.0*butter_ynmin1
[j-butter-1]+butter_ynmin2[j_butter-1]);
        }
        for(j_butter=0; j_butter<butter_npoles+1; j_butter++)
        {
            butter_ynmin2[j_butter]=butter_ynmin1[j_butter];
            butter_ynmin1[j_butter]=butter_yn[j_butter];
        }
/*Assign torque_meas_filt the filtered torque signal. */
    torque_meas_filt=butter_yn[butter_npoles];
}
void anti_itae_filt( )
/*
  This routine implements a 6th order Butterworth filter anti-causally.
  The input is the 200 point array trq_ff. The output is the 200 point
  array trq_ff after being anti-causally filtered. Input/output variable
  names are the same as was used in butter_filt.
/*
{
float tmp1, tmp2, tmp3, tmp4, anti_cycle;
long i_anti, anti_npoles, j_anti;
/*
  Calculate the coefficients for the filter. The 6th order filter
  is realized as 3 second order filters in series. The mapping
  to the z-domain is accomplished using Tustin's rule without any
prewarping.
*/
accel_meas_z=anti_pole;
if(anti_pole_last   !=anti_pole)
     {
       anti_pole=anti_pole*2.0*3.1415927;
       anti_pole=(2.0/0.005)*(tan(anti_pole*0.005/2.0));
       anti_pole=anti_pole/2.0/3.1415927;
       anti_pole_last=anti_pole;
       anti_npoles=3;
       anti_zeta[0]=sin(45.0*PI/180.0);
       anti_wn[0]=anti_pole*2.0*PI;
       anti_zeta[1]=sin(75.0*PI/180.0);
       anti_wn[1]=anti pole*2.0*PI;
       anti_zeta[2]=sin(15.0*PI/180.0);
       anti_wn[2]=anti_pole*2.0*PI;
       anti_cycle=0.005;
       for(i_anti=1; i_anti<anti_poles+1; i_anti++)
              {
               tmpl=(anti_wn[i_anti-1]*anti_cycle)*(anti_wn[i_anti-
```

APPENDIX A-continued

```
1]*anti_cycle);
            tmp2=4.0*(1.0+anti_zeta[i_anti-1]*anti_wn[i_anti-
1]*anti_cycle)+tmp1;
            tmp3=2.0*tmp1-8.0;
            tmp4=4.0*(1.0_anti_zeta[i_anti-1]*anti_wn[i_anti-
1]*anti_cycle)+tmp1;
            anti_a[i_anti]=tmp1/tmp2;
            anti_b[i_anti]=tmp3/tmp2;
            anti_c[i_anti]=tmp4/tmp2;
            }
}
for(j_anti=0; j_anti<=5; j_anti++)
    {
        v1[2000+j_anti]=0.0;
        v1[4000+j_anti]=0.0;
        v1[6000+j_anti]=0.0;
    }
/*-------------------------------------------------------
    Take the last 200 points of the output of the 3rd filter
    and store these back into v1(1:400).
    -------------------------------------------------------
*/
if(mtr_rate filt>0.0)
    {for(j_anti=0; j_anti<200; j_anti++)v1[j_anti]=trq_ff[j_anti];
     for(j_anti=0; j_anti<200; j_anti++)v1[j_anti+200]=trq_ff[j_anti];
     for(j_anti=0; j_anti<200; j_anti++)v1[j_anti+400]=trq-ff[j_anti];
     for(j_anti=0; j_anti<200; j_anti++)v1[j_anti+600]=trq-ff[j_anti];
    }else
    {for(j_anti=0; j_anti<200; j_anti++)v1[j_anti]=trq_ff[199-j_anti];
     for(j_anti=0; j_anti<200; j_anti++)v1[j_anti+200]=trq_ff[199j_anti];
     for(j_anti=0; j_anti<200; j_anti++)v1[j_anti+400]=trq_ff[199-j_anti];
     for(j_anti=0; j_anti<200; j_anti++)v1[j_anti+600]=trq_ff[199-j_anti];
    }
for(j_anti=0; j_anti<5; j_anti++)
    {
        v1[2794+j_anti]=0.0;
        v1[4794+j_anti]=0.0;
        v1[6794+j_anti]=0.0;
    }
/*-------------------------------------------------------
    reverse time filter the data.
    -------------------------------------------------------
*/
for(j_anti=797; j_anti>=0; j_anti--)
        {
         v1[j_anti+2000]=anti_b[1]*v1[j_anti+2000+1]
                 +anti_c[1]*v1[j_anti+2000+2]
         +anti_a[1]*(v1[j_anti]+2.0*v1[j_anti+1]+v1[j_anti+2]);
         v1[j_anti+4000]=anti_b[2]*v1[j_anti+4000+1]
                 +anti_c[2]*v1[j_anti+4000+2]
         +anti_a[2]*(v1[j_anti+2000]+2.0*v1[j_anti+2000+1]+v1[j_anti+2000+2]);
         v1[j_anti+6000]=anti_b[3]*v1[j_anti+6000+1]
                 +anti_c[3]*v1[j_anti+6000+2]
         +anti_a[3]*(v1[j_anti+4000]+2.0*v1[j_anti+4000+1]+v1[j_anti+4000+2]);
        }
/*-------------------------------------------------------
    The anti-casually filtered data is the last 200 points of
    the reverse time filtered data.
    -------------------------------------------------------
*/
if(mtr_rate_filt>0.0)
    {for(j_anti=0; j_anti<200; j_anti++)trq_ff[j_anti]=v1[j_anti+6000];
    }else
    {
     for(j_anti=0; j_anti<200; j_anti++)trq_ff[199-j_anti]=v1[j_anti+6000];
    }
    }
```

Having described the invention, the following is claimed:

1. A method for establishing current control values for an electric motor, said method comprising the steps of:

provide a table of motor current control values as a function of motor operating angle;

providing a torque request signal indicative of the desired amount of torque to be supplied by said motor;

providing a torque command signal having a value functionally related to said torque request signal and a feed-forward torque signal;

monitoring motor operating angle;

energizing said motor using current control values from said table in response to said torque command signal;

measuring the amount of torque ripple experienced by said motor when said motor is energized;

filtering said measured torque ripple using a time domain filter and providing a time domain filtered torque ripple signal;

averaging said time domain filtered torque ripple signal;

filtering said averaged time domain filtered torque ripple signal using a spatial domain filter and providing said feed-forward torque signal in response thereto; and storing current control values output to said motor as a function of motor operating angle for the provided torque request value when said torque ripple value is less than a predetermined value.

2. The method of claim 1 wherein said step of monitoring the motor operating angle includes the step of monitoring the electrical angle of said motor.

3. The method of claim 1 wherein said step of filtering said averaged time domain filtered torque ripple signal includes the step of anticausally filtering said averaged time domain filtered torque ripple signal.

4. The method of claim 1 further including the step of repeating of said steps for each 10% increment of a maximum possible torque request value.

5. The method of claim 1 further including the step of repeating all of said steps for each motor phase.

6. The method of claim 1 further including the step of repeating all of said steps for each quadrant of motor operation.

7. The method of claim 1 further including the steps of:

gain balancing said current control values to correct for motor quadrant operation; and storing gain balance values.

8. A method for providing a torque request signal indicative of the desired amount of torque to be supplied by an electric motor, said method comprising the steps of:

providing a torque command signal having a value functionally related to a torque request signal and a feed-forward torque signal;

monitoring motor operating angle;

energizing said motor in response to said torque command signal;

measuring the amount of torque ripple experienced by said motor when said motor is energized;

filtering said measured torque ripple using a time domain filter and providing a time domain filtered torque ripple signal;

averaging said time domain filtered torque ripple signal;

filtering said averaged time domain filtered torque ripple signal using a spatial domain filter and providing said feed-forward torque signal in response thereto; and storing feed-forward torque signals for later use to achieve a low torque ripple motor.

9. An apparatus for establishing current control values for an electric motor, said apparatus comprising:

memory means for storing a table of motor current control values as a function of motor operating angle;

input means for providing a torque request signal indicative of the desired amount of torque to be supplied by said motor;

means for providing a torque command signal having a value functionally related to said torque request signal and a feed-forward torque signal;

means for monitoring motor operating angle;

control means for energizing said motor using current control values from said table stored in said memory means in response to said torque command signal;

means for measuring the amount of torque ripple experienced by said motor when said motor is energized;

time domain filter means for filtering said measured torque ripple signal in the time domain and providing a time domain filtered torque ripple signal;

means for averaging said time domain filtered torque ripple signal;

spatial filter means for filtering said averaged time domain filtered torque ripple signal in the spatial domain and providing said feed-forward torque signal in response thereto; and memory means for storing current control values output to said motor as a function of motor operating angle for the provided torque request value when said torque ripple value is less than a predetermined value.

10. The apparatus of claim 9 wherein said means for monitoring the motor operating angle includes the means for monitoring the electrical angle of said motor.

11. The apparatus of claim 9 wherein said spatial filter means includes an anticausal filter.

12. The apparatus of claim 9 further including:

gain balancing means for gain balancing said current control values to correct for motor quadrant operation; and memory means for storing said gain balance values.

* * * * *